(12) United States Patent
Hirasawa (10) Patent No.: US 6,525,771 B1
(45) Date of Patent: *Feb. 25, 2003

(54) LENS CONTROL DEVICE

(75) Inventor: Masahide Hirasawa, Kanagawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,321

(22) Filed: May 27, 1997

Related U.S. Application Data (63) Continuation of application No. 08/434,319, filed on May 2, 1995, now abandoned, which is a continuation of application No. 08/118,016, filed on Sep. 8, 1993, now abandoned.

(30) Foreign Application Priority Data

Sep. 10, 1992 (JP) .............................................. 4-268174
Oct. 19, 1992 (JP) .............................................. 4-306162

(51) Int. Cl.$^7$ .......................... G03B 13/00; H04N 5/238
(52) U.S. Cl. ..................... 348/347; 348/229.1; 348/351; 348/354; 348/364
(58) Field of Search ................................ 348/207, 222, 348/229, 345, 347, 349, 350, 351, 353, 354, 355, 356, 362, 363, 364, 365; 396/89, 99, 96; H04N 5/232, 5/235, 5/238

(56) References Cited

U.S. PATENT DOCUMENTS

| | | | | |
|---|---|---|---|---|
| 4,853,788 A | * | 8/1989 | Murashima | 358/227 |
| 4,903,135 A | * | 2/1990 | Ohtake et al. | 348/354 |
| 4,967,280 A | * | 10/1990 | Takuma et al. | 358/227 |
| 5,005,087 A | * | 4/1991 | Suzuki et al. | 348/243 |
| 5,036,399 A | * | 7/1991 | Mabuchi | 358/225 |
| 5,077,613 A | * | 12/1991 | Hirao et al. | 348/243 |
| 5,212,515 A | * | 5/1993 | Ogasawa | 348/354 |
| 5,212,516 A | * | 5/1993 | Yamada et al. | 354/402 |
| 5,212,598 A | * | 5/1993 | Kiruchi | 359/823 |
| 5,260,736 A | * | 11/1993 | Toji | 348/353 |
| 5,604,537 A | * | 2/1997 | Yamazaki et al. | 348/350 |
| 6,047,102 A | * | 4/2000 | Ohta | 348/220 |

* cited by examiner

*Primary Examiner*—Ngoc-Yen Vu
(74) *Attorney, Agent, or Firm*—Robin, Blecker & Daley (57) ABSTRACT

A lens control device is arranged such that, in deciding a direction in which a focus lens is to be driven on the basis of the amount of change caused to take place in the level of a video signal by causing the focus lens to vibrate at a predetermined amplitude, the amplitude of the vibration of the focus lens is controlled according to the state of an AGC circuit.

25 Claims, 10 Drawing Sheets

| F No. | AMPLITUDE OF WOBBLING |
|---|---|
| 1.4~ | 1 |
| ~2.0 | 1 |
| ~2.8 | 1 |
| ~4.0 | 2 |
| ~5.6 | 2 |
| ~8 | 2 |
| ~16 | 3 |
| ~22 | 3 |
| 22~ | 4 |

LENS CONTROL DEVICE

This is a continuation divisional application under 37 CFR 1.62 of prior application Ser. No. 08/434,319 filed May 2, 1995, now abandoned which is a continuatin of Ser. No. 08/118,016, filed Sep. 8, 1993 (abandoned).

BACKGROUND OF THE INVENTION

1. Field of the Invention

This invention relates to a lens control device advantageously adapted for an image pickup apparatus such as a video camera or the like.

2. Description of the Related Art

The advancement and popularization of image pickup devices such as video cameras and the like have been widespread during recent years. The popularization of them has prompted many improvements and diversification of functions. Among these improvements, automatic focusing has become indispensable as a function, obviating the necessity of a focusing operation, a be the most troublesome operation.

Methods of varied kinds have been employed for automatic focusing devices. One of these methods called a "hill climbing" automatic focusing method is becoming most popular. In the hill climbing automatic focusing method, a signal such as a high-frequency component which indicates sharpness and varies with the state of focus is extracted from a video signal outputted from image pickup means which converts a picked up image into the video signal. With the state of focus thus detected from the sharpness-indicating signal, a focus lens is driven to bring the level of the sharpness-indicating signal to a maximum level. In accordance with this method, an infocus state can be determined from information obtained within a pickup image plane irrespective of the distance to an object of shooting. Other advantages of this method include a point that, unlike a so-called active automatic focusing method of illuminating the object with infrared rays or the like and detecting the rays thus reflected, this method dispenses with mechanisms such as an infrared ray emitting part and a light receiving part.

However, an automatic focusing (AF) method such as the above-stated method of using a video signal outputted from image pickup means and driving a focus lens in a direction in which the level of the high frequency component of the video signal comes to reach a peak level presents a problem in the following point. It is possible to find the direction in which the focus lens is to be moved from its current position for an in-focus position, i.e., in which the level of the high-frequency component reaches its peak level, when the focus lens is moving. If the focus lens is not moving, however, it is impossible to find the direction of the in-focus position on the basis of the level value of the high-frequency component alone.

In view of this problem, a direction determining method is employed. According to this method, the focus lens is forcibly vibrated at a predetermined amplitude in the direction of an optical axis, either constantly or only at the time of a start, and the direction in which the focus lens is to be driven is decided according to changes taking place in the level of the high-frequency component of the video signal. The vibration of the focus lens used in determining the direction is called wobbling.

The focus lens driving direction can be correctly decided by carrying out wobbling in this manner. However, there is another problem.

Changes in the high-frequency component, i.e., the sharpness of an image obtained through wobbling are affected by the influence of the depth of field. It is known that the amount of changes taking place in sharpness resulting from the same focus lens driving amount comes to vary when the depth of field of an optical system varies. For the same amplitude of wobbling, the sharpness varies to a greater extent accordingly as the depth of field is shallower and to a lesser extent accordingly as the depth of field is deeper. It has been proposed as a solution of this problem to increase the amplitude of wobbling when the depth of field is deep and to decrease the former when the latter is shallow, in such a way as to have the direction decided always at the same sensitivity.

However, this solution is still insufficient for some shooting conditions. For automatic exposure control, an aperture value in the video camera is automatically controlled to have the video signal at a constant level. When the shooting conditions yield a low illuminance, the position of an iris is automatically shifted to a full open position. Then, if the illuminance is found to be still insufficient, an automatic gain control (AGC) circuit comes to increase its rate of gain. As a result, the level of the video signal level is amplified to give an apposite exposure (an apposite signal level).

With the device arranged in the manner described above, the amplitude of wobbling cannot be changed and is left unvarying after the iris is fully opened. Therefore, the gain is increased by the AGC circuit while the amplitude of wobbling is left unvarying. However, as well known, the AGC circuit is a source of a noise. The noise is inevitably increased when the gain of the AGC circuit is increased. Meanwhile, the amplitude of wobbling is normally set to be sufficiently small to be indiscernible by visual sensations. Therefore, the changes introduced into sharpness by wobbling tend to be prevented by the noise from being accurately detected. Such a condition presents a serious problem as it tends to result in an erroneous decision.

Figure 8:
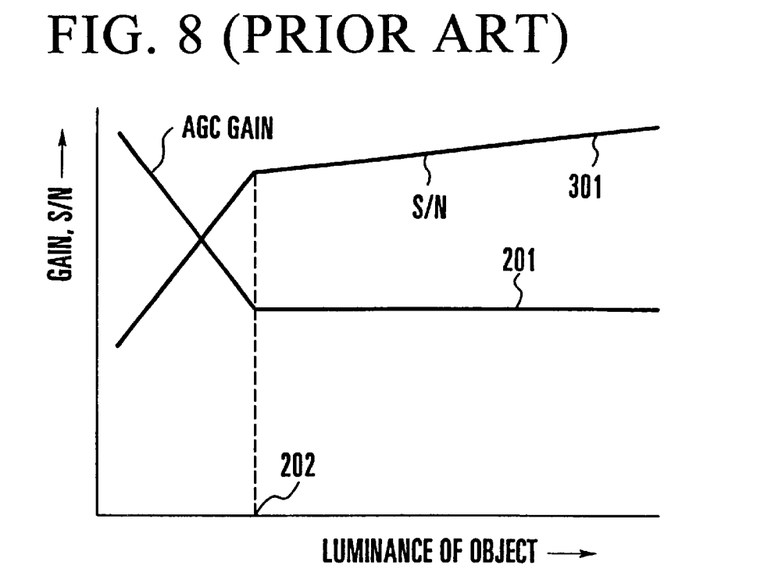
FIG. 8 is a characteristic diagram showing the gain of the AGC circuit and an S/N ratio in the lens control device in relation to the luminance of the object.
Figure 9:
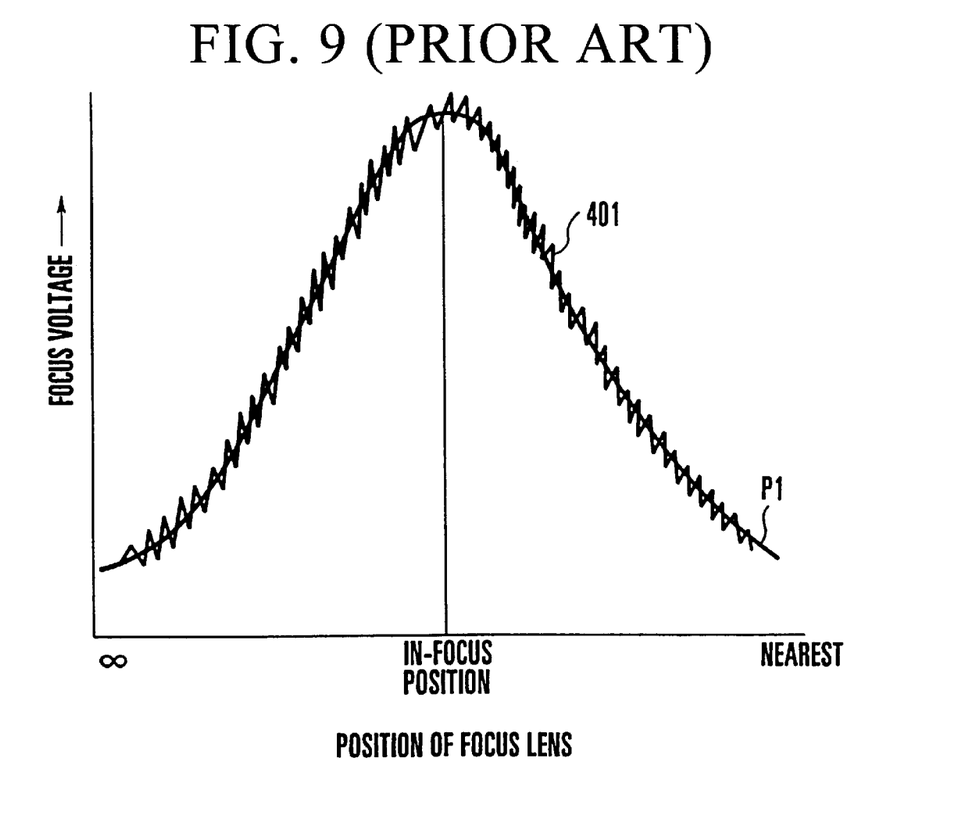
FIG. 9 shows the state of a noise superimposed on the focus voltage obtained by the lens control device.

FIG. 8 shows characteristic curves representing changes taking place in the gain of the AGC circuit and changes in an S/N ratio caused by the changes of the gain of the AGC circuit as in relation to the luminance of the object. Referring to FIG. 8, as shown by the curve 201, the gain is at "1" and is unvarying when the object is in a bright state as indicated on the right side of a point 202. However, when the object is in a low luminance state, on the left side of the point 201 as viewed on the drawing, where exposure control cannot be adequately carried out with the iris alone, the gain of the AGC circuit increases and, on the other hand, the S/N ratio is degraded. With the S/N ratio thus decreased, a focus voltage which is a sharpness signal (or the high frequency component of the video signal) changes in a manner as represented by a curve 401 in FIG. 9. Referring to FIG. 9, the focus voltage reaches a maximum value when the focus lens is in an in-focus position. The level of the focus voltage then lowers accordingly as the focus lens moves further away from the in-focus position. The noise comes to be more conspicuously superimposed on the focus voltage accordingly as the focus voltage becomes lower. The adverse effect of the noise then becomes so conspicuous that it becomes impossible to correctly decide the focus lens moving direction. The probability of making an erroneous decision increases under such a condition.

SUMMARY OF THE INVENTION

This invention is directed to the solution of the problems mentioned in the foregoing.

It is a first object of this invention to provide a lens control device which is arranged to be capable of correctly deciding the focus lens moving direction irrespective of shooting conditions.

It is a second object of this invention to provide a lens control device which is capable of accurately carrying out an automatic focusing action even when the object of shooting is at a low luminance.

It is a third object of this invention to provide a lens control device which is capable of always accurately carrying out an automatic focusing action without being affected by an adverse influence of an automatic gain control (AGC) circuit.

To attain these objects, a lens control device arranged as a preferred embodiment of this invention comprises focus control means arranged to detect an amount of change in the level of a video signal by driving a lens at a predetermined amplitude and to move the lens toward an in-focus point on the basis of the amount of change detected, level adjusting means for adjusting the level of the video signal, detecting means for detecting an amount of adjustment of the level of the video signal by the level adjusting means, and amplitude control means for varying the predetermined amplitude of the driving of the lens according to the amount of adjustment of the level detected by the detecting means.

With the lens control device arranged in the above-stated manner, the level adjusting amount of the level adjusting means arranged to adjust the level of the video signal is detected by the detecting means. The amplitude of the lens driving action is changed by the amplitude control means according to the amount of level adjustment. The lens is driven at the changed amplitude. Then, the amount of change taking place in the level of the video signal is detected. A direction in which the lens is to be moved is decided on the basis of the detected amount of change. The lens is moved in this direction. By this, focus control can be accomplished by the lens control device without being affected by noises.

It is a fourth object of this invention to provide a lens control device which is capable of performing automatic focusing control in an optimum manner by varying a focus lens driving characteristic according to the gain of automatic gain control (AGC).

It is a fifth object of this invention to provide a lens control device which is capable of performing automatic focusing control with an improved accuracy in the event of low illuminance.

These and other objects and features of this invention will become apparent from the following detailed description of embodiments thereof taken in connection with the accompanying drawings.

DETAILED DESCRIPTION OF THE PREFERRED EMBODIMENTS

The following describes in detail a lens control device arranged according to this invention through its embodiments with reference to drawings.

Figure 1:
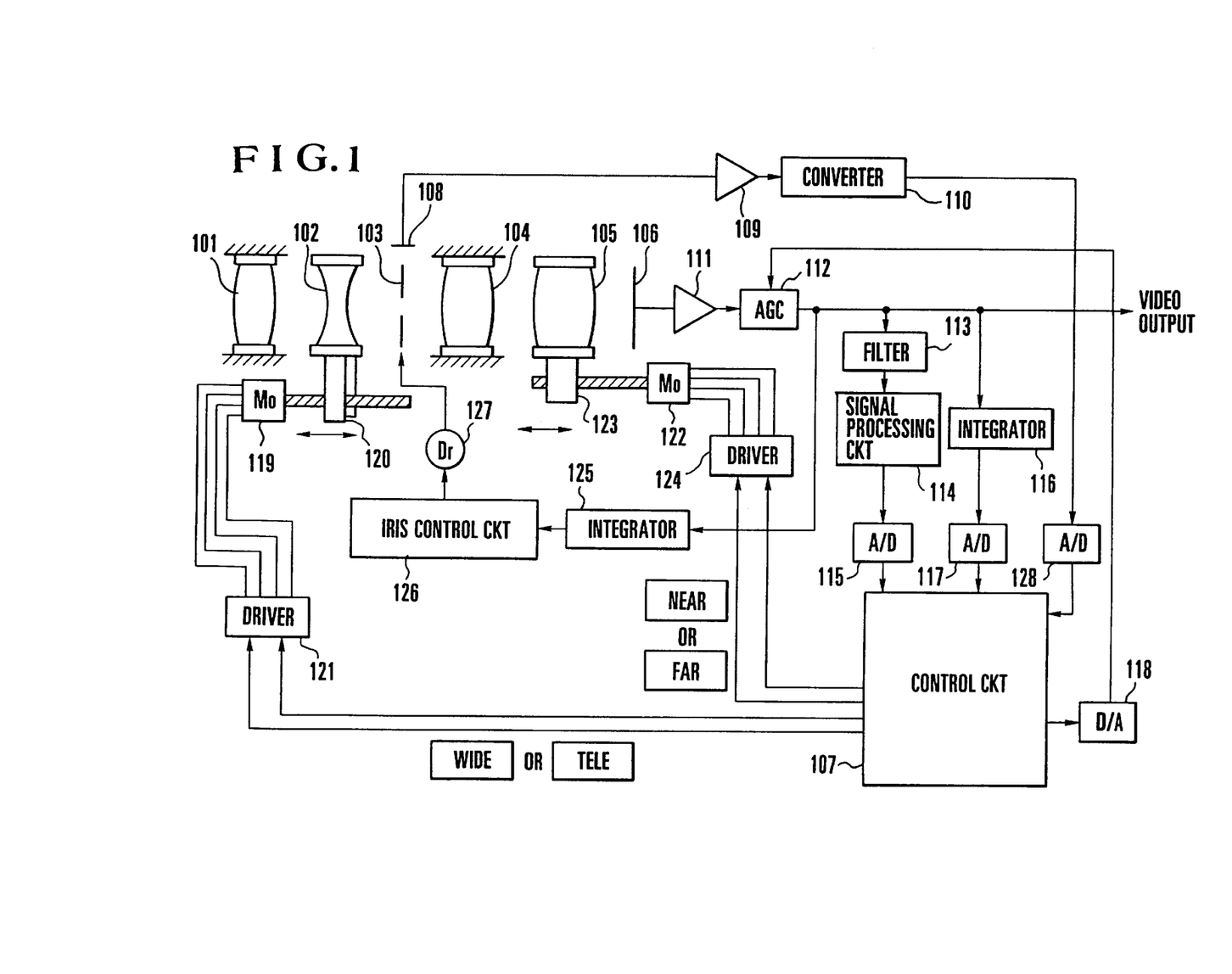
FIG. 1 is a block diagram showing a lens control device arranged as a first embodiment of this invention.

FIG. 1 is a block diagram showing a lens control device arranged as a first embodiment of this invention. Referring to FIG. 1, a first lens group 101 is stationary and is followed by other parts of an optical system arranged in the order of the following description. A second lens group 102 which hereinafter will be referred to as a variator lens is arranged to perform a magnifying power varying action by moving along an optical axis. An iris 103 is arranged rearwardly of the variator lens 102. A third lens 104 is arranged to be stationary. A fourth lens group 105 which hereinafter will be referred to as a focus lens is arranged to perform a focus adjusting (focusing) function and a compensator function by moving along the optical axis in such a way as to correct a deviation of a focal plane caused by the movement of the variator lens 102. An image sensor 106 is arranged rearwardly of the fourth lens group, i.e., the focus lens 105. Incident light passes through the first lens group 101 and the second lens group 102. The iris 103 adjusts the quantity of the incident light. With its quantity adjusted, the light passes through the third lens group 104 and the fourth lens group 105 to form an optical image of an object on an image pickup plane of the image sensor 106.

The image sensor 106 photoelectrically converts the optical image into a video signal. The video signal from the image sensor 106 comes via a buffer 111 to an AGC circuit 112 which is connected to the buffer 111. The AGC circuit 112 adjust the level of the video signal by varying the AGC circuit gain. The level-adjusted video signal is outputted from the AGC circuit 112. The video signal is supplied to a band-pass filter 113 which is connected to the AGC circuit 112. The band-pass filter 113 extracts a high-frequency component of the video signal. The high-frequency component signal thus extracted is supplied to a signal processing circuit 114 which is connected to the band-pass filter 113. The signal processing circuit 114 performs a predetermined signal processing action on the high-frequency component signal. The processed signal is analog-to-digital (A/D) converted by an A/D converter 115 which is connected to the signal processing circuit 114. The A/D converted signal is supplied to a control circuit (microcomputer) 107. The level of the signal outputted from the A/D converter 115 varies accordingly as the high-frequency component of the video signal increases or decreases. The level of the high-frequency component (signal) reaches a maximum level when the optical system is perfectly focused on the object of shooting, i.e., at an in-focus point, and become lower when the focused state comes out of focus.

The video signal outputted from the AGC circuit 112 is supplied also to an integrator 116 which is connected to the AGC circuit 112. The integrator 116 computes the integrated level value of the video signal. The output of the integrator 116 is A/D converted by an A/D converter 117 which is connected to the integrator 116. The output of the A/D converter 117 is inputted to the control circuit 107. Further the video signal from the AGC circuit 112 is supplied also to an integrator 125. The integrator 125 computes the integrated level value of the video signal. The output of the integrator 125 is inputted to an iris control circuit 126 which is connected to the integrator 125. The iris control circuit 126 drives, according to the level of the video signal, a driver 127 which controls the amount of opening (aperture position) of the iris 103 in such a way as to cause the iris 103 to give an apposite amount of exposure. An encoder 108 which is attached to the iris 103 is arranged to detect the aperture position of the iris 103 and to output it as a detection signal. The detection signal of the encoder 108 is supplied to a converter 110 via an amplifier 109 which is connected to the encoder 108. The converter 110 then converts the input information on the detected aperture position into a DC signal. The DC signal is A/D converted by an A/D converter 128 which is connected to the converter 110. The output of the A/D converter 128 is also supplied to the control circuit 107.

Meanwhile, an actuator (stepping motor) 122 which is arranged to be caused via the driver 124 to drive a rack 123 connected to the focus lens 105 (the fourth lens group), driver 124 being connected to the control circuit 107. The control circuit 107 causes the driver 124 to drive the actuator 122 in such a way as to bring the level of the signal outputted from the A/D converter 115 to a maximum level. Then, the actuator 122 in turn causes the focus lens 105 to move on the optical axis accordingly. Another actuator (stepping motor) 119 which is arranged to be caused via a driver 121 to drive a rack 120 connected to the variator lens 102 is also connected to the control circuit 107. The control circuit 107 causes the driver 121 to drive the actuator 119 according to the state of a zoom switch which is not shown. The actuator 119 in turn drives the variator lens 102 to move on the optical axis toward a telephoto end position or toward a wide-angle end position. Further, a control signal from the control circuit 107 is supplied to the AGC circuit 112 via a D/A (digital-to-analog) converter 118 which is connected to the control circuit 107. The amplifying rate of the AGC circuit 112 is thus controlled to be increased or decreased according to the level of the video signal supplied from the A/D converter 117.

Figure 2:
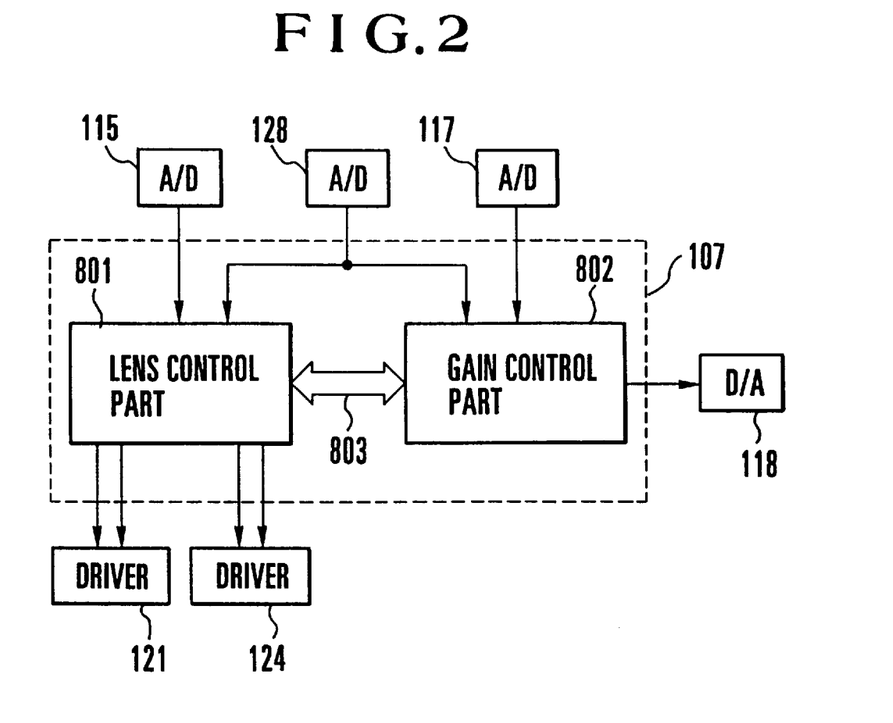
FIG. 2 is a block diagram showing the arrangement of a control circuit shown in FIG. 1.

In the case of this embodiment, the control circuit 107 which is thus arranged to perform driving control over the AGC circuit 112, the variator lens 102 and the focus lens 105 is divided into a lens control part 801 and a gain control part 802 as shown in FIG. 2. The two control parts 801 and 802 may be arranged to be controlled by a microcomputer. Referring to FIG. 2, the lens control part 801 is arranged, as mentioned above, to perform control to cause the variator lens 102 and the focus lens 105 to move on the optical axis. The gain control part 802 operates, according to the level of the video signal outputted from the A/D converter 117, to cause via the D/A converter 118 the gain of the AGC circuit 112 to be increased if the level of the video signal is low thus indicating a dark image or to be decreased if the level of the video signal is high thus indicating a bright image. With the gain of the AGC circuit 112 controlled in this manner, the level of the video signal is always adequately adjusted to a constant level so as to prevent it from becoming unstable.

Figure 7:
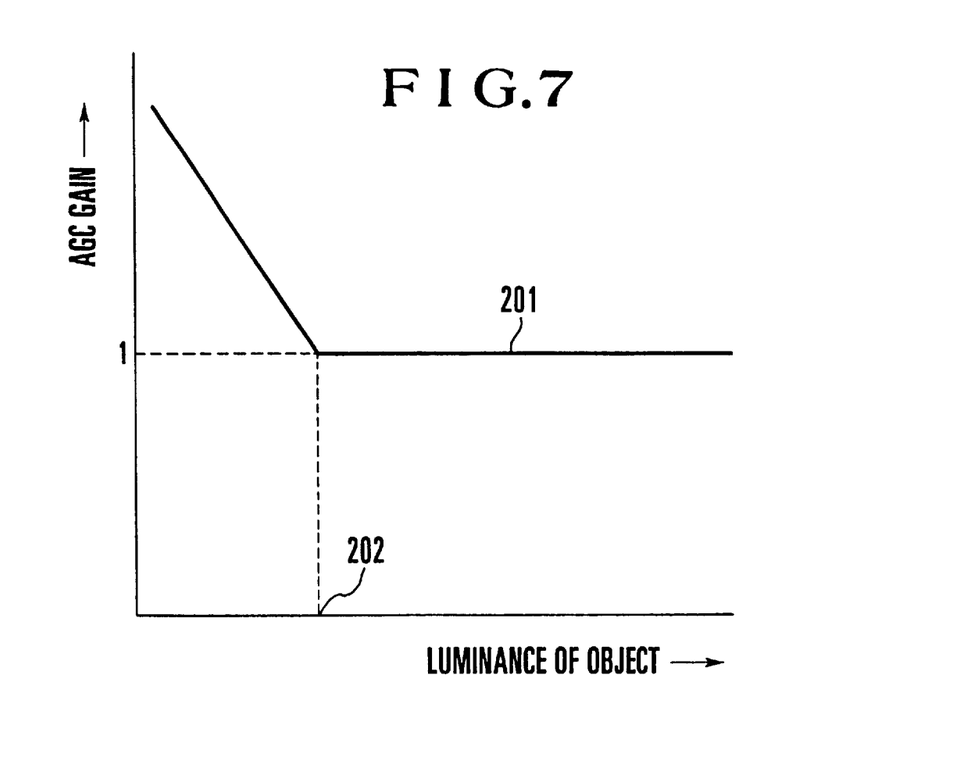
FIG. 7 is a characteristic diagram showing the gain of the AGC circuit in the lens control device in relation to the luminance of the object.

FIG. 7 is a characteristic diagram showing the gain of the AGC circuit 112 in relation to the luminance (or brightness) of the object. In a case where the luminance of the object is sufficient, the control circuit 107 controls and causes the gain of the AGC circuit 112 to be at "1" as indicated by a characteristic curve 201. In this case, an optimum level of the video signal is obtained by securing an apposite amount of exposure by adjusting the aperture position of the iris 103. When the object is dark and the iris 103 comes to its full open aperture position at a point 202 as shown in FIG. 7, the gain of the AGC circuit 112 is controlled to increase if the luminance of the object is on the darker side (the left side) of the point 202, so that the level of the video signal can be prevented from dropping. On the other hand, when it is found from the detection signal of the encoder 108 that the aperture position of the iris 103 is still within the range of control, the iris control circuit 126 is caused to operate by the signal outputted from the AGC circuit 112. The iris control circuit 126 then causes the driver 127 to drive and control the aperture position of the iris 103. The exposure for the video signal is thus corrected to adjust the level of the video signal as necessary.

Figure 5:
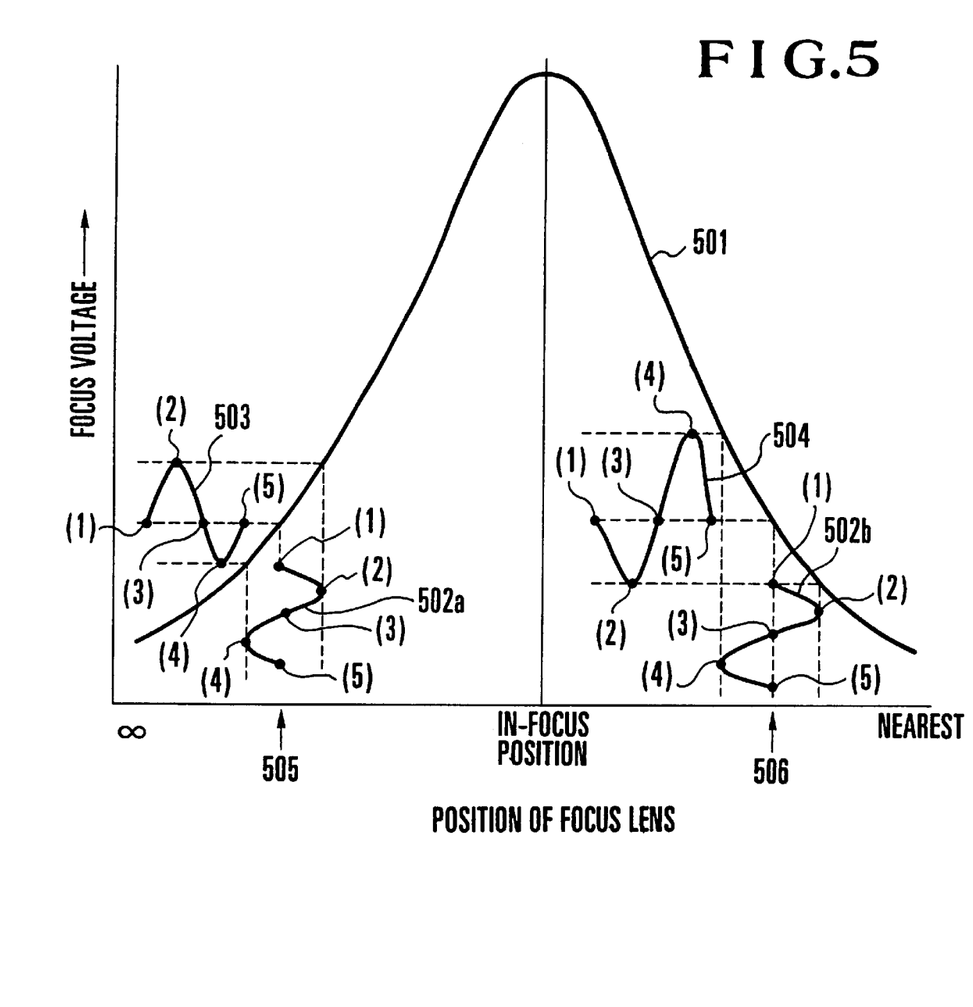
FIG. 5 shows the wobbling action of the lens control device.

FIG. 5 is a characteristic diagram showing the position of the focus lens (the fourth lens group) 105 in relation to a focus voltage, which indicates the high-frequency component of the video signal. The location of an in-focus position where the focus voltage reaches its maximum value is judged, in the manner as described in the foregoing, as to whether it is on the nearest distance side of the current position of the focus lens or on the infinity distance side of the current position. With the focus lens moving direction thus decided, the focus lens is moved toward the in-focus position and is brought to a stop at a point where the focus voltage shows the maximum value. Therefore, if the focus lens moving direction is not correctly decided, the in-focus position cannot be detected no matter how much the focus lens is moved.

To decide the focus lens moving direction, the action called wobbling is performed. Referring to FIG. 5, in a case where, for example, the current position of the focus lens is at a point 505 which is on the infinity distance side of an in-focus position, if the focus lens is moved to pass points (1) to (5) as indicated by a locus 502a, the lens moves closer to and farther away from the in-focus position. The focus voltage then varies in a manner as indicated by a locus 503. If the current position of the focus lens is, for example, at a point 506 which is on the nearest distance side of the in-focus position, the focus lens is moved to pass points (1) to (5) as indicated by a locus 502b. In this case, the focus voltage varies as indicated by a locus 504. Comparison between these loci 503 and 504 clearly shows a difference in phase of 180 degrees between the two focus curves. In deciding the focus lens moving direction, therefore, the current position of the focus lens can be determined as to whether it is a near-focus or far-focus position from the changes of the focus voltage detected by performing the wobbling action in a constant cycle and at a constant amplitude. The focus lens moving direction then can be decided according to the result of the detection.

Figure 6:
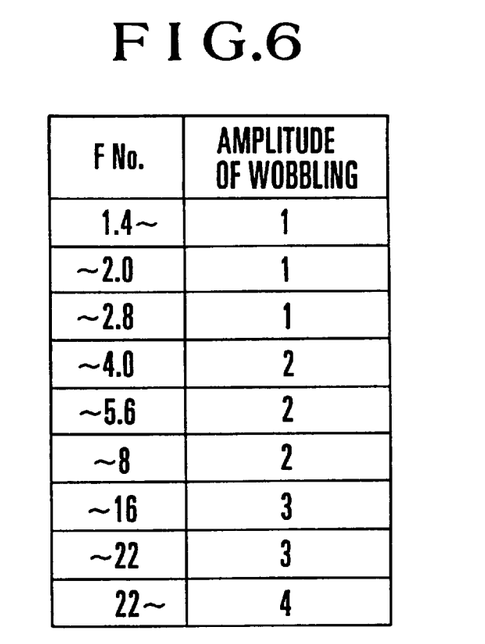
FIG. 6 shows an arrangement for setting the amplitude of wobbling.
Figure 10:
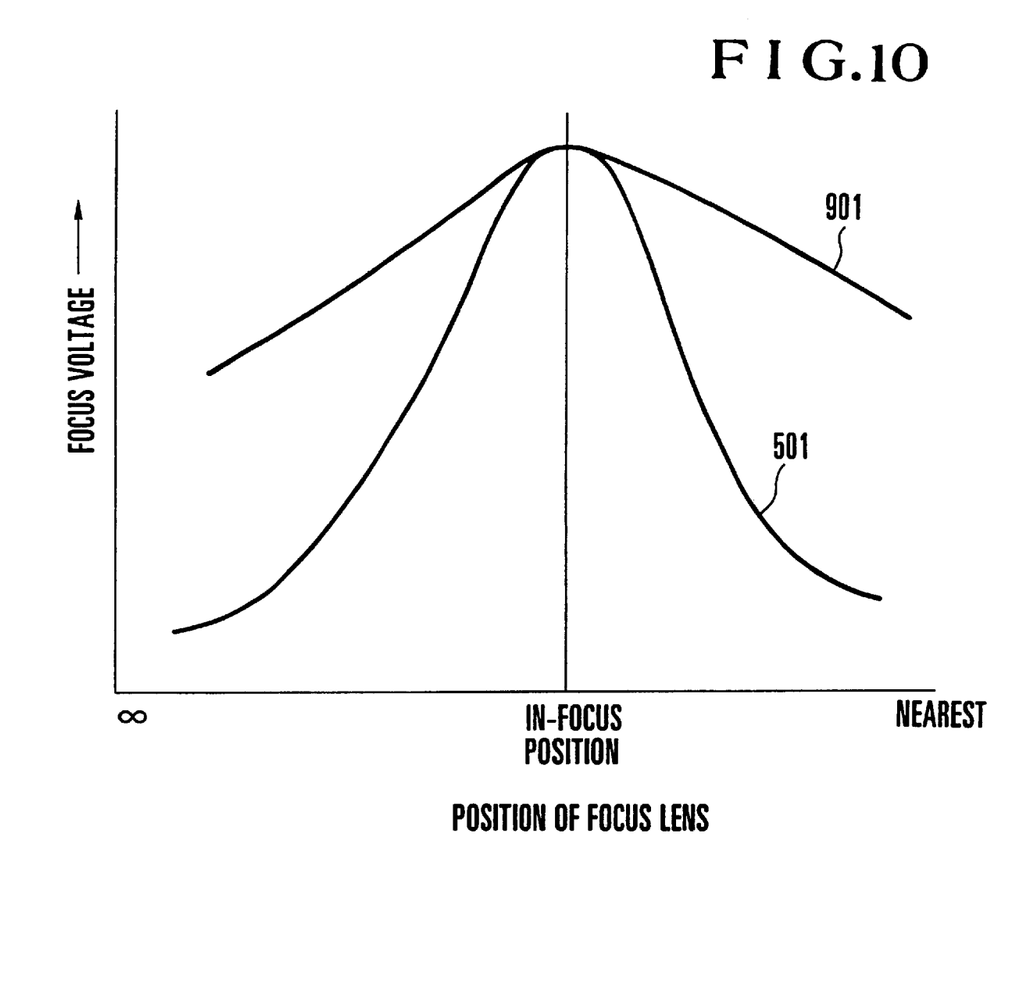
FIG. 10 is a characteristic diagram showing a relation between the position of a focus lens and the focus voltage with the depth of field used as a parameter on the basis the aperture position of an iris in the lens control device.

FIG. 10 is a characteristic diagram showing the relation of the focus voltage to the position of the focus lens as obtained by using as a parameter a depth of field found on the basis of the amount of opening, i.e., the aperture position, of the iris 103. When the depth of field becomes deep with the opening amount of the iris 103 becoming smaller, a curve 501 indicating the focus voltage becomes flatter as shown by another curve 901. In the case of a deep depth of field, if the wobbling action is performed at the same amplitude as in the case of a shallow depth of field, it becomes difficult to make a discrimination between a near-focus state and a far-focus state. To solve this problem, the embodiment is arranged to carry out the wobbling action by increasing the amplitude of wobbling accordingly as the value of aperture of the iris increases, as shown in FIG. 6. FIG. 6 shows a table of data stored in the control circuit 107 of the embodiment. The table shows the amplitudes of wobbling in the form of their ratios to aperture values, with the ratio of a wobbling amplitude to the full open aperture set at "1".

In the case of the conventional arrangement, the amplitude of wobbling is selected according to a depth of field obtained on the basis of the amount of opening (aperture) of an iris. Therefore, if the iris is in a full open state, one and the same wobbling amplitude is maintained irrespective of the gain of the AGC circuit 112. As a result, with the iris remaining in the full open state and the luminance of the object coming to gradually decrease to cause the gain of the AGC circuit to gradually increase, when the ratio of the focus voltage level to a noise level (the S/N ratio of the focus voltage) decreases as shown in FIG. 8, the focus voltage becomes as indicated by a curve 401 in FIG. 9. As shown in FIG. 9, the noise comes to be conspicuously superimposed. The noise level in relation to the amplitude indicated by the loci 503 and 504 in FIG. 5 eventually can no longer be ignored. The probability of erroneously deciding the focus lens moving direction is thus increased by the noise.

To solve this problem, the embodiment of this invention is arranged to control the amplitude of wobbling in cases where the gain of the AGC circuit increases as no apposite exposure is obtainable even with the iris fully opened because of a low luminance of the object.

Figure 3:
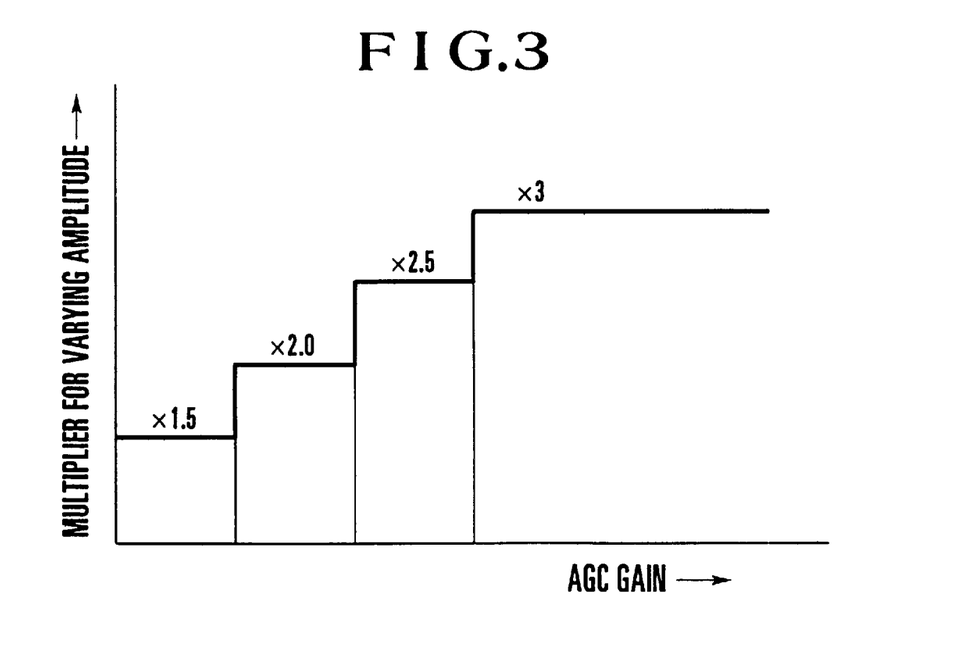
FIG. 3 is a characteristic diagram showing the gain of an AGC circuit in relation to multipliers used for varying the amplitude of wobbling.
Figure 4:
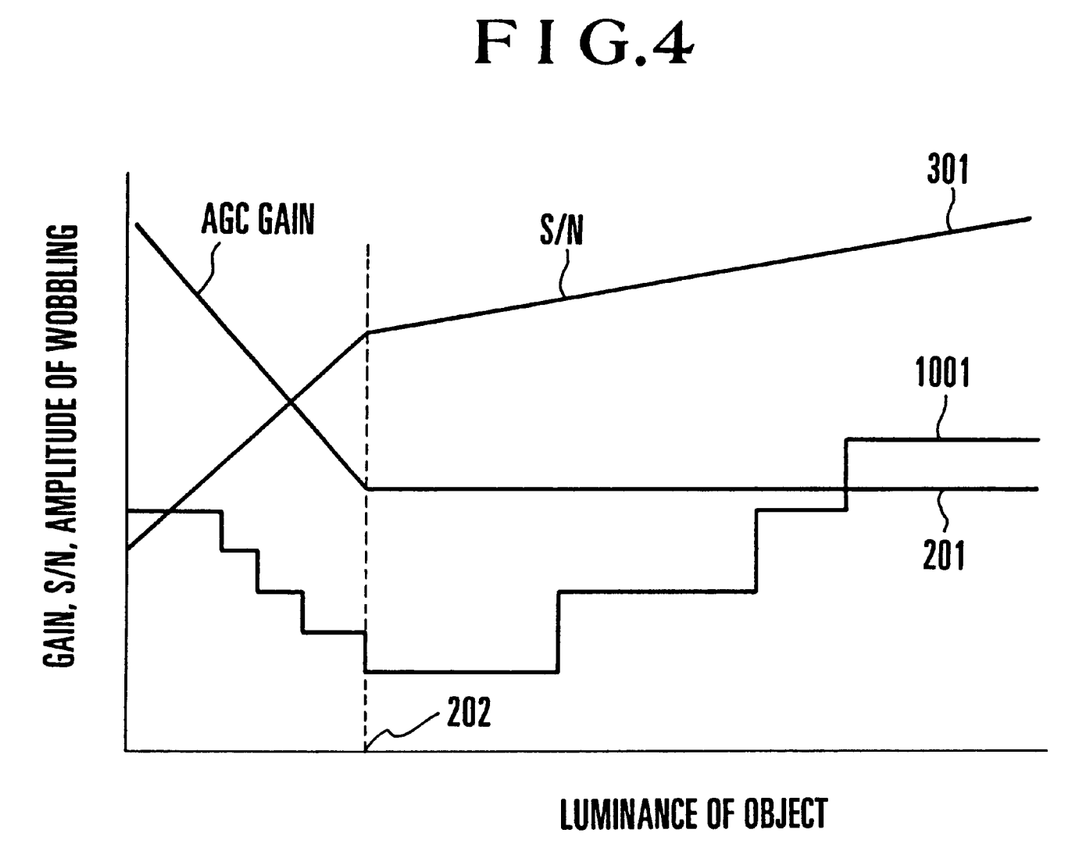
FIG. 4 is a characteristic diagram showing the gain of the AGC circuit, an S/N ratio and the amplitude of wobbling in the embodiment of this invention in relation to the luminance of an object of shooting.

FIG. 3 shows, in a characteristic diagram, various multipliers employed in varying the wobbling amplitude in relation to the gain of the AGC circuit. FIG. 4 shows, in a characteristic diagram, the gain of the AGC circuit, the S/N ratio and the amplitude of wobbling in relation to the luminance of the object.

In the arrangement of the lens control device described with reference to FIG. 2 in the foregoing, information on a gain set for the AGC circuit 112 by the gain control part 802 is transmitted via a communication line 803 to the lens control part 801. If the lens control part 801 and the gain control part 802 is arranged within one microcomputer, the communication line 803 is not necessary. In that instance, the lens control part 801 is arranged to read the information on the gain out from a RAM which stores the gain set by the gain control part 802. The lens control part 801 is provided with means for varying the wobbling amplitude according to the gain information on a predetermined condition.

FIG. 3 shows multipliers to be set by the varying means for varying the amplitude of wobbling in relation to the gain of the AGC circuit 112. In the case of this embodiment, the amplitude of wobbling is arranged to be increased stepwise at the rates of 1.5 times, 2 times, 2.5 times and 3 times accordingly as the gain of the AGC circuit 112 is increased. As already mentioned in the foregoing, the gain of the AGC circuit 112 is increased only when the iris 103 is in a fully open state. Referring to FIG. 6, the amplitude of wobbling is arranged, in the case of this embodiment, to be varied and increased at the multiplying rates shown in FIG. 3 only within a range of aperture values where the original amplitude is at "1". In other words, the gain of the AGC circuit 112 becomes close to "1" when it becomes possible to stop down the aperture position of the iris 103. Therefore, the amplitudes of wobbling shown in FIG. 6 can be used as they are.

Therefore, the gain of the AGC circuit 112, the amplitude of wobbling and the S/N ratio in relation to the luminance of the object become as shown in FIG. 4. With the amplitude of wobbling controlled to vary as indicated by a line 1001, even if the gain of the AGC circuit 112 comes to increase as indicated by a line 201 and the S/N ratio of the focus voltage is deteriorated as indicated by a line 301, the focus lens moving direction can be correctly decided without being affected by the noise.

With this embodiment arranged in this manner, even if the S/N ratio of the focus voltage is deteriorated by the increase of the gain of the AGC circuit 112 due to a dark state of the object, the focus lens driving and moving direction is correctly decided without being affected by the adverse effect of the noise, so that the focusing control over the focus lens can be accomplished within a short period of time.

While the embodiment is arranged to vary the amplitude of wobbling by multiplying a standard value by a predetermined value, the invention is not limited to this arrangement. The arrangement may be changed to vary the amplitude of wobbling by setting some absolute amplitude values of wobbling and by selecting one of the set values as applicable. Further, it is also possible to replace the use of dispersedly set values, like in the case of this embodiment, with use of some continuous value that can be defined as a function.

As described above, the embodiment is arranged to perform focusing control over the lens as follows. The level adjusting amount of level adjustment means which adjusts the level of a video signal is detected. The lens driving amplitude is varied by varying means according to the level adjusting amount. The lens is moved at the amplitude thus varied and the amount of change resulting in the level of the video signal is detected. Therefore, even in a case where the S/N ratio of the focus voltage is deteriorated by an increase in the gain of the AGC circuit because of a dark state of the object, the embodiment carries out the focusing control over the focus lens in a short period of time by accurately deciding the focus lens driving direction without being affected by the noise.

Next, a second embodiment of this invention is described referring to FIG. 11 and others as follows.

When the luminance of the object is at a certain sufficiently high level, the aperture position of the iris 103 is within a controllable range. In this instance, an exposure for the video signal is corrected independently by a system consisting of the integrator 125 and the iris control circuit 126, and the level of the video signal is adjusted as a result of the exposure correction, as mentioned in the foregoing. When the iris 103 fully opens (and its aperture position becomes no longer adjustable), the gain control is performed by the AGC circuit 112. In that instance, it is not only the wobbling action that is affected by the increase of the gain of the AGC circuit. The automatic focusing control itself is also greatly affected by the adverse effect of the increased gain.

In the lens control device, the focus lens 105 is arranged to move when the amount of the high-frequency component (focus voltage) of the video signal increases or decreases. In other words, automatic focus adjustment is made by moving the focus lens 105 in such a way as to maximize the amount of the high-frequency component. The state of increase or decrease in the amount of the high-frequency component of the video signal in relation to the position of the focus lens is indicated by a curve P1 in FIG. 14. In moving the focus lens to bring the focus voltage to its maximum value, the focus lens must be brought to a stop at a point where the focus voltage comes to its maximum value while the focus lens is in process of being moved toward an in-focus position. A method for detecting the position of the focus lens is described as follows.

The maximum value of the focus voltage greatly varies with the object and shooting conditions. The focus voltage, therefore, cannot be considered to be at its maximum value simply when it reaches a predetermined value. The maximum value might be lower than the predetermined value for one object and higher than the predetermined value for another object. In view of this, as indicated by a curve P2 in FIG. 14, the value of the focus voltage is always subjected to a peak hold action while the focus lens is in process of being moved toward an in-focus position. The moving direction of the focus lens is inverted at a point where the value of the focus voltage begins to decrease from an upward trend and the focus lens is moved backward until the focus voltage becomes equal to the peak hold value.

Figure 14:
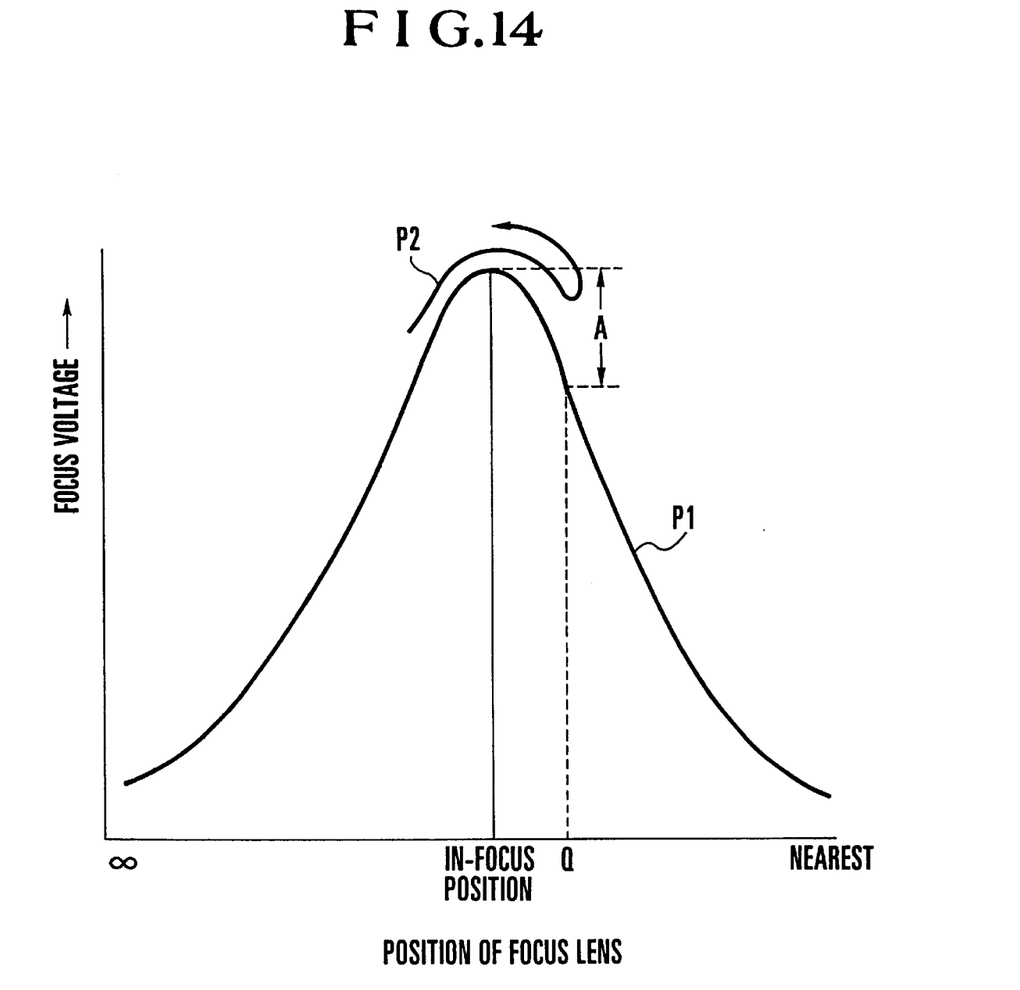
FIG. 14 shows the focus voltage and the amount of overshoot in relation to the position of a focus lens.

In this instance, with the adverse effect of a noise taken into consideration, the moving direction of the focus lens is not inverted, for example, until it moves from an in-focus position further to a position Q where the level of the focus voltage level drops as much as a level difference A from the peak hold value. Hereinafter, this value A will be called an "overshoot value" of the focus lens.

In the lens control device described above, the focusing action is controlled with the overshoot value fixed at a predetermined value. The fixed overshoot value presents no problem so long as the gain of the AGC circuit is low thus causing not much adverse effect of a noise. However, in cases where the gain of the AGC circuit increases after the iris is fully opened, the level of noise superimposed on the curve P1 of the focus voltage becomes so high that it can no longer be ignored as indicated by a locus 401 in FIG. 9. In that instance, the signal from the A/D converter 115 is caused to fluctuate by the noise and it becomes hardly possible to accurately detect the increase or decrease of the focus voltage. The inaccurate detection then increases the probability of mistaking a defocus position for an in-focus position.

To solve this problem, a lens control device is arranged as the second embodiment of this invention to prevent any deviation from an in-focus position due to the adverse effect of the noise or the like. For this purpose, the device is arranged to correct the behavior of the focus lens by comparing the level of the video signal with a reference level and is provided with signal level adjusting means for adjusting the level of the video signal, adjusting amount detecting means for detecting the amount of adjustment of the level of the video signal by the signal level adjusting means, and reference level varying means for varying the reference level according to the amount of adjustment.

The signal level adjusting means is arranged to adjust the level of the video signal, for example, by increasing or decreasing the gain of a AGC circuit. The S/N ratio of a focus voltage signal which is a high-frequency component of the video signal decreases when the gain of the AGC circuit increases. In view of this, the adjustment amount detecting means is arranged to detect the amount of adjustment of the level of the video signal, i.e., the amount of increase or decease of the gain of the AGC circuit. Then, in accordance with the amount of increase or decrease of the gain of the AGC circuit, the reference level varying means varies the reference level which is determined, for example, for an in-focus position of the focus lens.

Figure 11:
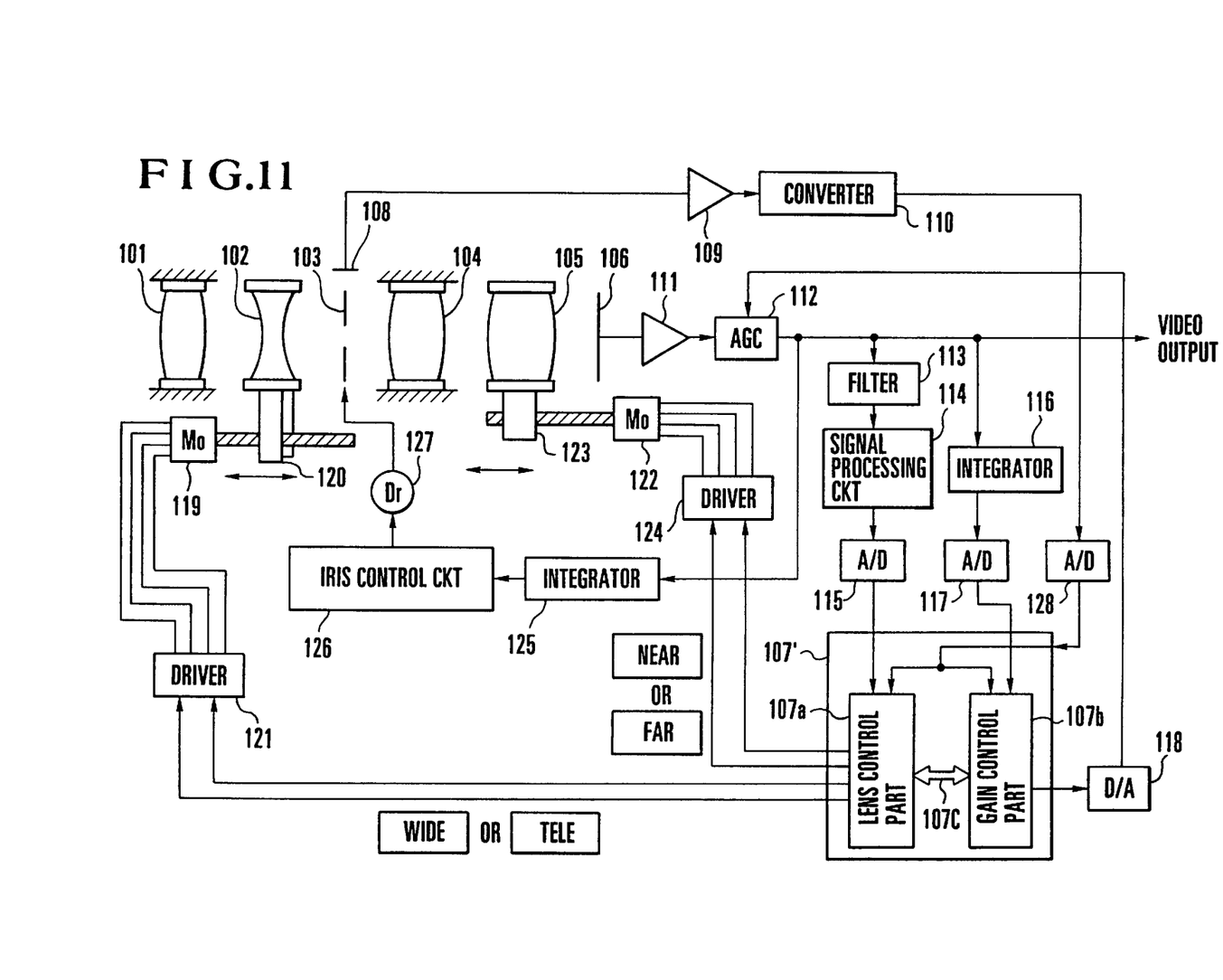
FIG. 11 is a block diagram showing a lens control device arranged as a second embodiment of this invention.

FIG. 11 shows in a block diagram the arrangement of the second embodiment of this invention. Referring to FIG. 11, the arrangement of the second embodiment is the same as that of the first embodiment except for the processing operation of the control circuit which is arranged to control the whole operation of the device. Therefore, with the exception of this part, the rest of arrangement of the second embodiment are omitted from description.

Referring to FIG. 11, a control circuit 107' is arranged to control driving actions on the variator lens 102 and the focus lens 105 and also to control the AGC circuit 112 on the basis of the outputs of the A/D converters 115, 117 and 128. The control circuit 107' includes therein a lens control part 107a and a gain control part 107b.

The lens control part 107a is arranged to receive a signal outputted from the A/D converter 115. This signal has a value which increases or decreases according to the level of the high-frequency component of the video signal. The value of the high-frequency component reaches a maximum value when an in-focus state is attained and decreases when an image picked up becomes blurred. The lens control part 107a causes the focus lens 105 to be moved in such a way as to bring the signal outputted from the A/D converter 115 to its maximum value. Further, depending on the state of a zoom switch which is not shown, the lens control part 107a supplies a driving instruction to the drivers 121 and 124 to cause the variator lens 102 to be moved either toward a telephoto end position or toward a wide-angle end position.

The gain control part 107b is arranged to receive a signal outputted from the A/D converter 117. This signal indicates the level of the video signal. If the signal outputted from the A/D converter 117 is at a low level, the image picked up is considered to be dark. In this instance, the gain control part 107b instructs the AGC circuit 112 via the D/A converter 118 to increase its gain. If this signal is at a high level, the gain control part 107b instructs the AGC circuit 112 via the D/A converter 118 to decrease the gain. The gain control part 107b is thus arranged to adjust the level of the video signal to prevent it from becoming unstable.

In actuality, the level of the video signal is adjusted in one of two different manners in most cases. In a case where the object has a sufficient luminance, the amplifying rate of the AGC circuit 112 is set, for example, at "1" to secure an adequate amount of exposure by mainly adjusting the aperture position of the iris 103 for obtaining an adequate level of the video signal. Further, the gain of the AGC circuit 112 comes to exceed the amplifying rate "1" only when the luminance of the object is low. For example, in a case where the amount of light is still insufficient and gives a dark image even after the iris 103 is fully opened, the gain of the AGC 112 is increased to prevent the level of the video signal from becoming low.

The relation of the gain of the AGC circuit 112 and the S/N ratio of the focus voltage signal to the luminance of the object is as shown in FIG. 8. With the iris 103 assumed to be in a fully open position at a point 202 as indicated in FIG.

8, the gain of the AGC circuit 112 gradually increases accordingly as the object becomes darker in the area on the lower luminance side of the point 202. Then, the S/N ratio of the focus voltage signal gradually decreases accordingly as the gain of the AGC circuit 112 increases.

Between the lens control part 107a and the gain control part 107b, there is provided a communication line 107c. Information on the level of the gain of the AGC circuit 112 is transmitted to the lens control part 107a through this communication line 107c. If the lens control part 107a and the gain control part 107b are disposed within one microcomputer, the lens control part 107a may be arranged to read the gain out from a RAM which is arranged to store information on the gain for the gain control part 107b. Such an arrangement dispenses with the communication line 107c.

Figure 12:
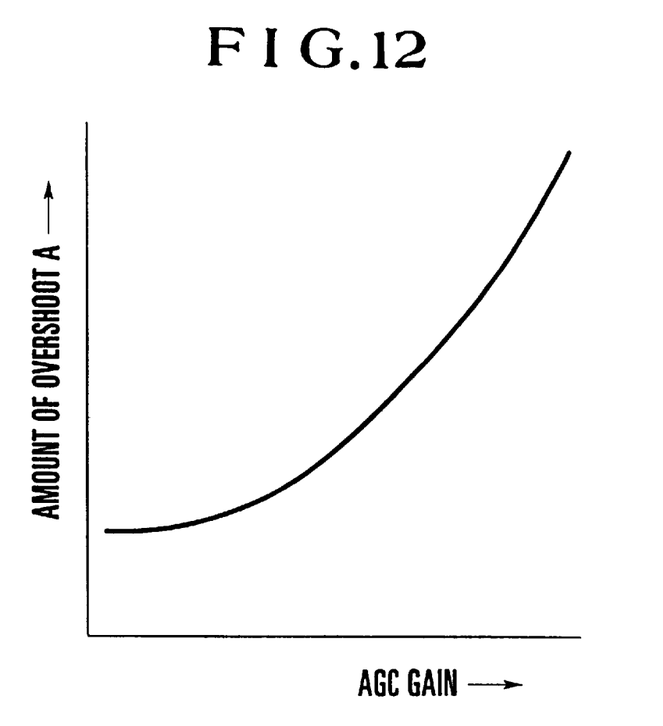
FIG. 12 shows the amount of overshoot A in relation to the gain of AGC.

At the lens control part 107a, the amount of the overshoot A of the focus lens is set at the lens control part 107a as shown in FIG. 12. As shown, the overshoot amount A is set at a low value when the gain of the AGC circuit 112 is low. The setting value of the overshoot amount A is increased accordingly as the gain of the AGC circuit 112 increases. While the increment curve of the overshoot amount A is indicated in the form of a quadratic curve in FIG. 12, this curve should be changed according to the manner in which the S/N ratio degrades in relation to the gain of the AGC circuit 112.

Figure 13:
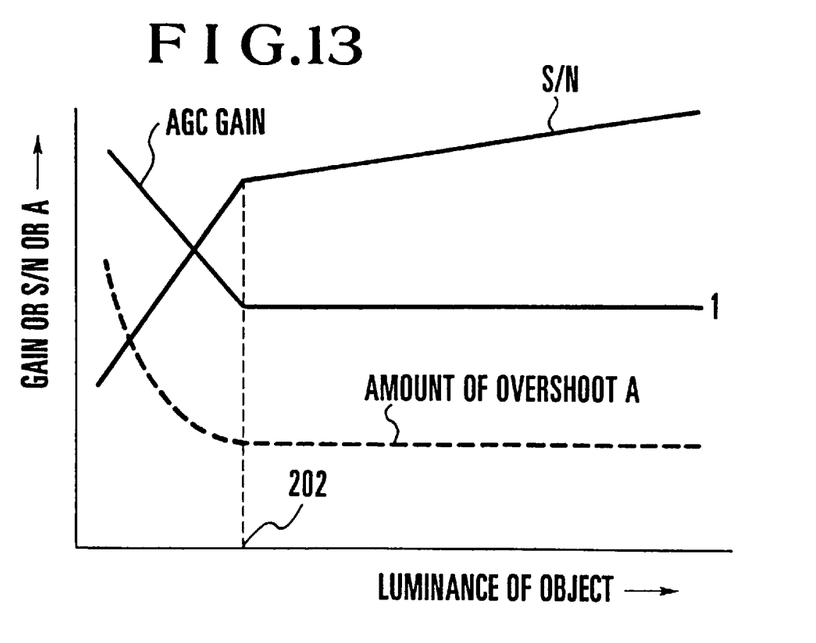
FIG. 13 shows the gain of AGC, an S/N ratio and the amount of overshoot A in relation to the luminance of an object.

In FIG. 13, the curve of the overshoot amount of the focus lens shown in FIG. 12 is superposed on FIG. 8. As shown in FIG. 13, with the gain of the AGC circuit 112, the S/N ratio and the overshoot amount A controlled in the manner described, the overshoot amount of the focus lens can be secured as necessary, so that a search for a part where the focus voltage reaches its maximum level can be adequately accomplished even in a case where the S/N ratio of the focus voltage signal is deteriorated by an increase in the gain of the AGC circuit 112.

As described in the foregoing, the lens control device which is arranged according to this invention to vary the behavior of the lens by comparing the level of a video signal with a reference level is provided with signal level adjusting means for adjusting the level of the video signal, adjusting amount detecting means for detecting the amount of adjustment of the level of the video signal by the signal level adjusting means, and reference level varying means for varying the reference level according to the amount of adjustment. Therefore, level control can be smoothly carried out by accurately detecting an in-focus position without being affected by an increase in noise resulting from an increase in the level of the video signal.

What is claimed is:

1. A lens control device comprising:
   a) driving means for driving a lens;
   b) detection means for detecting a specific signal component of a video signal as a focus evaluating value;
   c) level control means for controlling a gain to keep a level of the video signal at a predetermined value;
   d) focus control means for causing said driving means to vibrate said lens, detecting a chance of a level of the specific signal component and causing said driving means to drive said lens in a direction which the level of the specific signal component increase determined a moving direction; and
   e) control means for changing a moving amplitude of the vibration of said lens for determining the direction in which said lens is to be driven in response to a change of a value of the gain varied by said level control means.

2. A device according to claim 1, wherein said driving means is arranged to cause the lens to vibrate in the direction of an optical axis.

3. A device according to claim 2, wherein said focus control means is arranged to detect a change of the level of a high-frequency component of the video signal caused by the vibration of said lens and to decide, from a direction in which the level of the high frequency component increases as said direction in which said lens is to be driven.

4. A device according to claim 1, wherein said level control means is an AGC circuit arranged to vary the gain applied to the video signal.

5. A device according to claim 4, wherein said control means is arranged to increase the amplitude of vibration of said lens above a first amplitude by controlling said driving means when the gain of the AGC circuit exceeds a predetermined value.

6. A device according to claim 4, wherein said AGC circuit is arranged to increase the gain applied to said video signal when a state of underexposure exists after an iris is fully opened.

7. An image pickup apparatus comprising:
   a) a focus lens;
   b) focus adjusting means arranged to cause said focus lens to make a reciprocating motion back and forth in a first moving range for detection means for detecting a specific signal component of a video signal as a focus evaluating value;
   c) level control means for controlling a gain to keep a level of the video signal at a predetermined value;
   d) focus control means for causing said focus adjusting means to vibrate said lens, detecting a change of a level of the specific signal component and causing said focus adjusting mean to drive said lens in a direction which the level of the specific signal component increase determined a moving direction; and
   e) control means for changing a moving amplitude of the vibration of said lens for determining the direction in which said lens is to be driven in response to a change of a value of the gain varied by said level control means.

8. An apparatus according to claim 7, wherein said control means is arranged to increase the amplitude of the reciprocating motion to an amplitude higher than a first amplitude.

9. An apparatus according to claim 8, wherein said level control means includes an AGC circuit and is arranged to determine the low illuminance state by detecting an increase of a gain of said AGC circuit.

10. An apparatus according to claim 7, further comprising image pickup means, and wherein said focus adjusting means is arranged to decide a driving direction of said focus lens from a change of the level of a high-frequency component of a video signal outputted from said image pickup means.

11. A focus control device comprising:
    a) focus adjusting means for adjusting focus by comparing the level of a focus signal which is extracted from a video signal and indicates a state of focus with a predetermined level;
    b) signal level adjusting means operable for maintaining the level of the video signal to a constant value by changing a gain; and
    c) control means for varying said predetermined level on the basis of the gain changed by said signal level adjusting means such as to vary an amount of overshoot to be allowed after a focus lens passes the position the focus signal reaches the maximum level and until the inversion of the moving direction of said focus lens.

12. A device according to claim 11, wherein said focus adjusting means includes a focus lens and a focus lens driving means.

13. A device according to claim 12, said focus adjusting means is arranged to drive said focus lens in such a manner as to cause the level of said focus signal to become a maximum level, to invert a moving direction of said focus lens when the level of said focus signal drops to the predetermined level after said focus lens has passed a position where the level of the focus signal becomes the maximum level, and to bring said focus lens to a stop when said focus lens comes back to the position where the level of the focus signal becomes the maximum level.

14. A device according to claim 13, wherein the level of said focus signal is the level of a high-frequency component of a video signal.

15. A device according to claim 13, wherein said signal level adjusting means includes an AGC circuit arranged to keep the level of the video signal constant by varying a gain of said AGC circuit according to the illuminance of an object.

16. A device according to claim 15, wherein, when the gain of said AGC circuit increases, said control means lowers the predetermined level and increases the amount of overshoot to be allowed after said focus lens passes the position where the focus signal reaches the maximum level and until the inversion of the moving direction of said focus lens.

17. A lens control device comprising:
a) focus adjusting means for driving a focus lens in such a manner as to cause a level of a focus signal extracted from an image signal to become a maximum level and reversing a moving direction of said focus lens when the level of the focus signal drops a predetermined value from the maximum level;
b) gain control means for controlling a gain of the image signal; and
c) level control means for controlling said predetermined value for reversing said focus adjusting means in response to an increase of the gain set by said gain control means, so as to increase the predetermined value and increase an amount of overshoot by which said focus lens is driven until the inversion of the moving direction of said focus lens after said focus lens passes the position where the focus signal has reached the maximum level.

18. A device according to claim 17, wherein the level of said focus signal is the level of a high-frequency component of the image signal.

19. A focus control device, comprising:
a) focus adjusting means for adjusting a focus condition;
b) focus control means for detecting a moving direction of the focus adjusting means by wobbling said focus adjusting means in a direction of an optical axis;
c) gain control means for controlling a gain for an image signal to keep a level of the image signal at a constant value; and
d) control means for increasing a moving amplitude of the wobbling operation of said focus adjusting means for determining the direction of said focus adjusting means in response to a raise of the gain of said gain control means.

20. A device according to claim 19, wherein said focus control means judges near-focus, far-focus and in-focus from variation in the level of the image signal caused when the focus adjusting means is wobbled back and forth.

21. A device according to claim 19, wherein said control means detects whether or not there is luminance of the image signal and increases the amplitude of the wobbling when the luminance is low.

22. A focus control apparatus, comprising:
a) focus adjusting means for adjusting a focus condition;
b) focus detecting means for detecting a direction of said focus adjusting means in which said focus adjusting means is to be moved and deciding the direction by wobbling said focus adjusting means in a direction of an optical axis;
c) luminance level discriminating means for discriminating a luminance level of an image signal; and
d) control means for enlarging a moving amplitude of the wobbling operation of said focus adjusting means by said focus detecting means in response to a raise of the luminance level discriminated by said luminance level discriminating means.

23. A device according to claim 22, wherein said luminance level discriminating means includes an AGC circuit and detects a low luminance state from a gain of the AGC circuit.

24. A device according to claim 22, wherein said luminance level discriminating means detects a low luminance state.

25. A device according to claim 24, wherein said control means increases the amplitude of wobbling of said focus adjusting means when the low luminance state is detected by said luminance level discriminating means.

* * * * *

UNITED STATES PATENT AND TRADEMARK OFFICE
CERTIFICATE OF CORRECTION

PATENT NO.  : 6,525,771 B1
DATED       : February 25, 2003
INVENTOR(S) : Masahide Hirasawa It is certified that error appears in the above-identified patent and that said Letters Patent is hereby corrected as shown below:

<u>Column 1,</u>
Line 21, delete "a be the most" and insert -- a the most --.

Signed and Sealed this

Second Day of December, 2003

JAMES E. ROGAN
*Director of the United States Patent and Trademark Office*